United States Patent
Tanaka et al.

(10) Patent No.: US 9,543,079 B2
(45) Date of Patent: Jan. 10, 2017

(54) PRODUCTION PROCESS FOR ELECTRODE MATERIAL, ELECTRODE AND ELECTRIC STORAGE DEVICE

(71) Applicant: JSR CORPORATION, Minato-ku (JP)

(72) Inventors: Ryo Tanaka, Minato-ku (JP); Kouji Senoo, Minato-ku (JP); Takahiro Shimizu, Minato-ku (JP); Yukio Hosaka, Minato-ku (JP); Fujio Sakurai, Minato-ku (JP); Satoshi Shimobaba, Minato-ku (JP); Motoki Okaniwa, Minato-ku (JP); Nobuyuki Miyaki, Minato-ku (JP); Yuuichi Eriyama, Minato-ku (JP)

(73) Assignee: JSR CORPORATION, Minato-ku (JP)

( * ) Notice: Subject to any disclaimer, the term of this patent is extended or adjusted under 35 U.S.C. 154(b) by 118 days.

(21) Appl. No.: 14/458,603

(22) Filed: Aug. 13, 2014

(65) Prior Publication Data

US 2015/0048273 A1   Feb. 19, 2015

(30) Foreign Application Priority Data

Aug. 19, 2013 (JP) ................. 2013-169567

(51) Int. Cl.
| | |
|---|---|
| *H01M 4/60* | (2006.01) |
| *H01M 4/04* | (2006.01) |
| *H01M 4/583* | (2010.01) |
| *H01G 11/86* | (2013.01) |
| *H01M 4/36* | (2006.01) |
| *H01G 11/50* | (2013.01) |
| *H01G 11/38* | (2013.01) |
| *H01M 4/38* | (2006.01) |
| *H01M 4/587* | (2010.01) |
| *H01G 11/06* | (2013.01) |
| *H01M 4/13* | (2010.01) |

(52) U.S. Cl.
CPC .............. *H01G 11/86* (2013.01); *H01G 11/38* (2013.01); *H01G 11/50* (2013.01); *H01M 4/04* (2013.01); *H01M 4/0471* (2013.01); *H01M 4/364* (2013.01); *H01M 4/386* (2013.01); *H01M 4/587* (2013.01); *H01M 4/60* (2013.01); *H01G 11/06* (2013.01); *H01M 4/13* (2013.01); *H01M 4/583* (2013.01); *H01M 4/602* (2013.01); *Y02E 60/13* (2013.01)

(58) Field of Classification Search
CPC .......... H01M 4/60; H01M 4/64; H01M 4/583; H01M 4/04; H01M 4/0471; H01M 4/602; H01M 2004/027
USPC ....................... 252/182.1; 429/211
See application file for complete search history.

(56) References Cited

U.S. PATENT DOCUMENTS

| | | | |
|---|---|---|---|
| 6,506,868 B1 | 1/2003 | Goda et al. | |
| 6,525,160 B1 | 2/2003 | Goda et al. | |
| 7,658,863 B2 | 2/2010 | Aramata et al. | |
| 7,790,316 B2 | 9/2010 | Aramata et al. | |
| 2012/0244435 A1* | 9/2012 | Hirose ................. | H01M 4/134 429/211 |

FOREIGN PATENT DOCUMENTS

| | | |
|---|---|---|
| JP | 2-8209 A | 1/1990 |
| JP | 5-271549 A | 10/1993 |
| JP | 8-236104 A | 9/1996 |
| JP | 10-255791 A | 9/1998 |
| JP | 11-322323 A | 11/1999 |
| JP | 2000-203818 A | 7/2000 |
| JP | 2001-59011 A | 3/2001 |
| JP | 2001-240670 A | 9/2001 |
| JP | 2001-294639 A | 10/2001 |
| JP | 2001-345100 A | 12/2001 |
| JP | 2002-220431 A | 8/2002 |
| JP | 2002-231225 A | 8/2002 |
| JP | 2002-293933 A | 10/2002 |
| JP | 2003-48953 A | 2/2003 |
| JP | 2004-296269 A | 10/2004 |
| JP | 2005-310759 A | 11/2005 |
| JP | 2006-59558 A | 3/2006 |
| JP | 2006-62949 A | 3/2006 |
| JP | 2009-246137 A | 10/2009 |

* cited by examiner

*Primary Examiner* — Khanh Tuan Nguyen
*Assistant Examiner* — Haidung Nguyen
(74) *Attorney, Agent, or Firm* — Oblon, McClelland, Maier & Neustadt, L.L.P.

(57) ABSTRACT

The present invention relates to a production process for an electrode material, an electrode and an electric storage device, and the production process for an electrode material comprises a step of heating a polymer having a silicon-containing unit and a silicon-non-containing unit.

20 Claims, No Drawings

PRODUCTION PROCESS FOR ELECTRODE MATERIAL, ELECTRODE AND ELECTRIC STORAGE DEVICE

TECHNICAL FIELD

The present invention relates to a production process for an electrode material, an electrode and an electric storage device. More particularly, the present invention relates to a production process for an electrode material that is preferably used for an electric storage device such as a lithium ion secondary battery or a lithium ion capacitor, an electrode comprising an electrode material obtained by the process and an electric storage device equipped with the electrode as a negative electrode.

BACKGROUND ART

In recent years, the progress of downsizing and lightening of electronic equipments is remarkable, and with this, requirements for downsizing and lightening of batteries used as power sources for driving the electronic equipments have also much more increased. In order to meet such requirements for downsizing and lightening, a nonaqueous electrolyte secondary battery, such as a lithium ion secondary battery, has been developed as an electric storage device. Further, as an electric storage device having properties such as high output density and favorable cycle performance, an electric double layer capacitor is known. Furthermore, as an electric storage device meeting uses requiring high energy density property and high output property, a lithium ion capacitor wherein electric storage principals of a lithium ion secondary battery and an electric double layer capacitor are combined is known.

As negative electrode materials used for such electric storage devices, carbon particles such as graphite particles have been used for, for example, a lithium ion secondary battery. However, with the aim of further increase in capacity, a composite material of carbon and silicon has been studied. For example, in a patent literature 1, a lithium ion secondary battery containing carbonaceous particles obtained by calcining a mixture of a silicon precursor such as polyethoxysilane and a carbon precursor such as a furan resin, pulverizing the calcined product to prepare silicon-containing carbonaceous particles, coating the particles with a carbon precursor such as coal tar pitch and then calcining the carbon precursor is described. In a patent literature 2, a lithium ion secondary battery containing a composite electrode material obtained by adding a mixture of a carbon precursor organic polymer compound such as a furan resin and an organosilicon compound such as a tetramethoxysilane partial condensate to graphite particles and calcining the resulting mixture is described.

CITATION LIST

Patent Literature

Patent literature 1: JP-A-2001-345100
Patent literature 2: JP-A-2002-231225

SUMMARY OF INVENTION

Technical Problem

However, if graphite particles are used as they are, as a negative electrode material, defects assumed to be attributable to decomposition reaction of an electrolytic solution on highly active particle surfaces are liable to occur. The materials described in the aforesaid patent literatures are those obtained with the aim of obtaining materials of large charge-discharge capacity, but each of the raw materials before carbonization is a mixture of raw materials having poor compatibility in each other or a coated material thereof, so that so-called phase separation tends to occur, and in the resulting carbon-based material, the size of a phase containing a silicon element tends to become larger. In the case where a negative electrode containing a carbon-based material having such a large-sized phase containing a silicon element is used for a lithium ion secondary battery and charge and discharge are carried out, deterioration of the negative electrode occurs particularly centering around a silicon element of high volume expansion, and therefore, a problem that the capacity is lowered as the cyclic test is repeated has occurred. On this account, there are troubles in practical use of the materials described in the patent literatures as the electrode materials of the electric storage devices such as a lithium ion secondary battery.

The present invention has been made in view of such circumstances of the prior art, and it is an object of the present invention to provide a production process for an electrode material from which an electrode having stable charge-discharge cycle property and having large charge-discharge capacity can be obtained.

Solution to Problem

In order to solve the above problem, the present inventors have earnestly studied. As a result, they have found that the above problem can be solved by using, as a raw material, a polymer having both of a silicon-containing unit and a silicon-non-containing unit, and they have accomplished the present invention.

The present invention provides a production process for an electrode material, which comprises a step of heating a polymer having a silicon-containing unit and a silicon-non-containing unit (said polymer being also referred to as a "specific polymer" hereinafter) or a composition comprising the specific polymer and a carbon material.

Further, the present invention provides an electrode comprising an electrode material produced by the above process (said electrode material being also referred to as a "present electrode material" hereinafter) and an electric storage device equipped with the electrode as a negative electrode.

Advantageous Effects of Invention

According to the present invention, an electrode having stable charge-discharge cycle property and having large charge-discharge capacity can be obtained. Therefore, the present electrode material is extremely useful as an electrode material of an electric storage device such as a lithium ion secondary battery or a lithium ion capacitor.

DESCRIPTION OF EMBODIMENTS

The present invention will be described in detail hereinafter.

Production Process for Electrode Material

The production process of the present invention is characterized by comprising a step of heating a specific polymer or a composition comprising a specific polymer and a carbon material. In such a production process of the present invention, a mixture of a silicon-containing component and a silicon-non-containing component that usually have poor compatibility in each other is not used but a specific polymer in which these components are contained in one molecule is used as a raw material, and therefore, it is thought that an electrode material wherein a phase containing a silicon element as a main component is finely dispersed in a phase containing carbon as a main component can be obtained. On this account, an electrode containing the present electrode material has large charge-discharge capacity and exhibits stable charge-discharge cycle property.

In the specific polymer, the silicon-containing unit is not specifically restricted as long as it is a partial structure containing a silicon atom. The silicon-containing unit is preferably a unit having a repeating unit containing a silicon atom, and from the viewpoint of ease of synthesis, a straight-chain structure having a repeating unit containing a silicon atom is preferable. Examples of the silicon-containing units include units having a polysiloxane structure, a polysilane structure, a polysilazane structure, a polycarbosilane structure or the like. Of these, a unit having a polysiloxane structure is preferable as the silicon-containing unit, from the viewpoint of ease of synthesis. The polysiloxane structure is a structure having plural Si—O bonds, and is, for example, a structure represented by —(Si(R)$_2$—O)$_n$— (R is a hydroxyl group, a halo group or an organic group, and n is an integer of 2 or greater). Likewise, the polysilane structure is a structure having plural Si—Si bonds, the polysilazane structure is a structure having plural Si—N bonds, and the polycarbosilane structure is a structure having plural Si—C bonds.

The number of the silicon-containing units contained in the specific polymer may be one or may be a plural number. When plural silicon-containing units are contained in the specific polymer, they may be the same as or different from each other.

In the unit having a repeating unit containing a silicon atom, an organic group, such as hydrocarbon group, alkoxy group, aryloxy group or acyl group, is preferably bonded to the silicon atom from the viewpoint of heightening the desired effect.

The hydrocarbon group is preferably a hydrocarbon group having 1 to 20 carbon atoms in total, and specific examples thereof include a methyl group, an ethyl group, an n-propyl group, an isopropyl group, an n-butyl group, a sec-butyl group, a tert-butyl group, an n-pentyl group, an n-hexyl group, an n-heptyl group, a cyclohexyl group and a phenyl group.

The alkoxy group is preferably an alkoxy group having 1 to 20 carbon atoms in total, and specific examples thereof include a methoxy group, an ethoxy group, an n-propoxy group and an isopropoxy group.

The aryloxy group is preferably an aryloxy group having 6 to 20 carbon atoms in total, and specific examples thereof include a phenyloxy group.

The acyl group is preferably an acyl group having 1 to 20 carbon atoms in total, and specific examples thereof include a formyl group, an acetyl group and a propionyl group.

In the unit having a repeating unit containing a silicon atom, the repetition number of the repeating units containing a silicon atom is preferably 2 to 10000, more preferably 3 to 1000, still more preferably 3 to 500.

On the other hand, in the specific polymer, the silicon-non-containing unit is not specifically restricted as long as it is a partial structure containing no silicon atom. The silicon-non-containing unit is preferably a unit that is carbonized in a heat treatment at a high temperature (e.g., 600 to 3000° C.) in an atmosphere substantially containing no oxygen.

As such a silicon-non-containing unit, a unit having a repeating unit containing no silicon atom is preferable, and a unit having a repeating unit derived from an organic monomer containing no silicon atom is more preferable. Above all, a unit having an epoxy resin structure, a phenolic resin structure, a vinyl polymer structure, a polyamide acid structure, a polyimide structure, a polyamideimide structure, a polyurethane structure or the like is preferable from the viewpoint of ease of production. The epoxy resin structure is a structure that can be said to be an epoxy resin if its structural part only is seen, and is a structure having a repeating unit derived from a monomer that is used when an epoxy resin is synthesized by a hitherto publicly known process. Likewise, each of the resin structures such as the phenolic resin structure, the vinyl polymer structure, the polyamide acid structure, the polyimide structure, the polyamideimide structure and the polyurethane structure is a structure that can be said to be a resin if its structural part only is seen, and is a structure having a repeating unit derived from a monomer that is used when the resin is synthesized by a hitherto publicly known process.

Although the number of the silicon-non-containing units contained in the specific polymer may be one or may be a plural number, it is preferably one. When plural silicon-non-containing units are contained in the specific polymer, they may be the same as or different from each other.

Specific examples of the epoxy resin structures include bisphenol A type epoxy resin structure, bisphenol F type epoxy resin structure and novolak type epoxy resin structure.

Specific examples of the phenolic resin structures include novolak type phenolic resin structure.

Examples of vinyl-based monomers that can be raw materials of the vinyl polymer structures include aromatic vinyl compounds, such as styrene, α-methylstyrene, vinylxylene, monochlorostyrene, dichlorostyrene, monobromostyrene, dibromostyrene, p-butylstyrene, ethylstyrene, vinylnaphthalene, o-methylstyrene, p-methylstyrene, dimethylstyrene, sodium styrenesulfonate and divinylbenzene; methacrylic acid esters, such as methyl methacrylate, ethyl methacrylate, 2-ethylhexyl methacrylate, butyl methacrylate, glycidyl methacrylate and allyl methacrylate; acrylic acid esters, such as methyl acrylate, ethyl acrylate, butyl acrylate, hydroxyethyl acrylate and dimethylaminoethyl acrylate; vinyl cyanide compounds, such as acrylonitrile and methacrylonitrile; olefins, such as ethylene and propylene; conjugated diolefins, such as butadiene, isoprene and chloroprene; maleimides, such as N-phenylmaleimide, N-methylmaleimide, N-ethylmaleimide, N-o-chlorophenylmaleimide and N-cyclohexylmaleimide; unsaturated carboxylic acids or acid anhydrides thereof, such as acrylic acid, methacrylic acid, crotonic acid, cinnamic acid, itaconic acid, maleic acid and maleic anhydride; vinyl acetate; vinyl chloride; vinylidene chloride; and triallyl isocyanurate. The vinyl polymer structure is preferably a polymer structure obtained by the use of at least one vinyl-based monomer selected from the group consisting of aromatic vinyl compounds, methacrylic acid esters, acrylic acid esters, vinyl cyanide compounds and conjugated diolefins. Specific examples of the vinyl polymer structures include polystyrene structure, polyacrylonitrile structure, styrene/acrylonitrile copolymer structure, acrylonitrile/butadiene copolymer structure, acrylonitrile/ethylene/styrene copolymer structure, acrylonitrile/chlorinated polyethylene/styrene copolymer structure, acrylonitrile/styrene/acrylate copolymer structure, acrylonitrile/butadiene/styrene copolymer structure, styrene/(meth)acrylate copolymer structure and styrene/methyl methacrylate copolymer structure.

Although the polyamide acid structure, the polyimide structure and the polyamideimide structure are not specifically restricted, they are each preferably a structure containing an aromatic ring in its structure.

The specific polymer is a polymer in which such a silicon-containing unit and such a silicon-non-containing unit as above are chemically bonded to each other.

The specific polymer can be produced by a publicly known process For example, a production process for an epoxy resin to which a unit derived from polysiloxane is bonded is disclosed in JP-A-2001-59011 and JP-A-2003-48953; a production process for a phenolic resin to which a unit derived from polysiloxane is bonded is disclosed in JP-A-2001-294639; a production process for a vinyl polymer to which a unit derived from polysiloxane is bonded is disclosed in JP-A-1990-8209 and JP-A-1993-271549; a production process for polyamide acid to which a unit derived from polysiloxane is bonded is disclosed in JP-A-2002-293933; a production process for polyamideimide to which a unit derived from polysiloxane is bonded is disclosed in JP-A-2001-240670; and a production process for polyurethane to which a unit derived from polysiloxane is bonded is disclosed in JP-A-2002-220431.

The specific polymer is, for example, a polymer in which a group represented by the following formula (1) and a polymer having a repeating unit derived from an organic monomer containing no silicon atom are bonded to each other. Examples of the polymers having a repeating unit derived from an organic monomer containing no silicon atom include epoxy resin, phenolic resin, vinyl polymer, polyamide acid, polyimide, polyamideimide and polyurethane.

[Chem. 1]

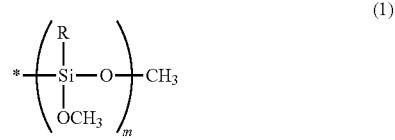

(In the formula (1), R is independently a methyl group or a methoxy group, m is an integer of 2 or greater, and "*" is a bonding hand.)

Examples of such polymers include polymers having structures represented by the following group.

[Chem. 2]

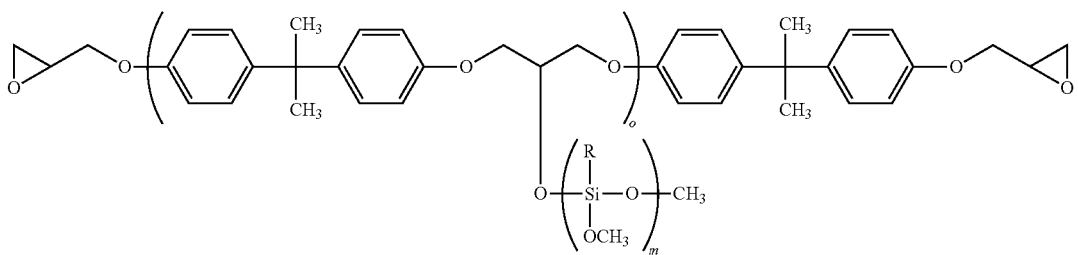

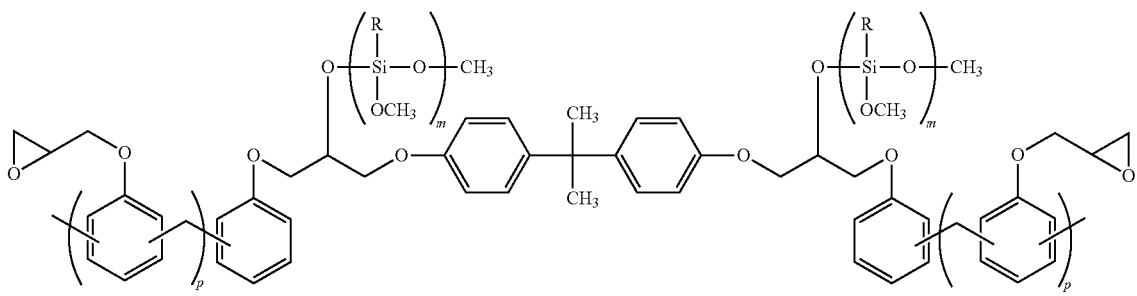

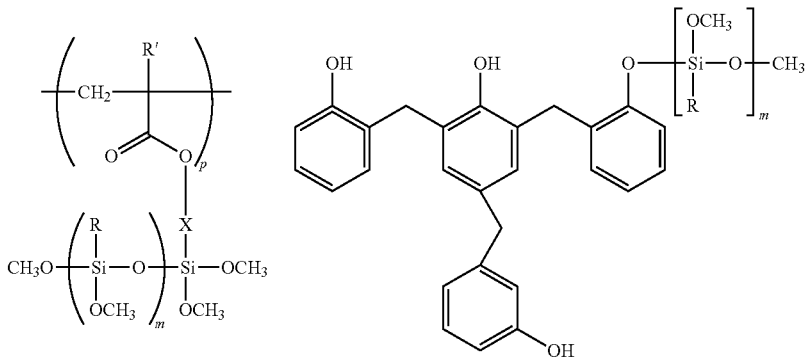

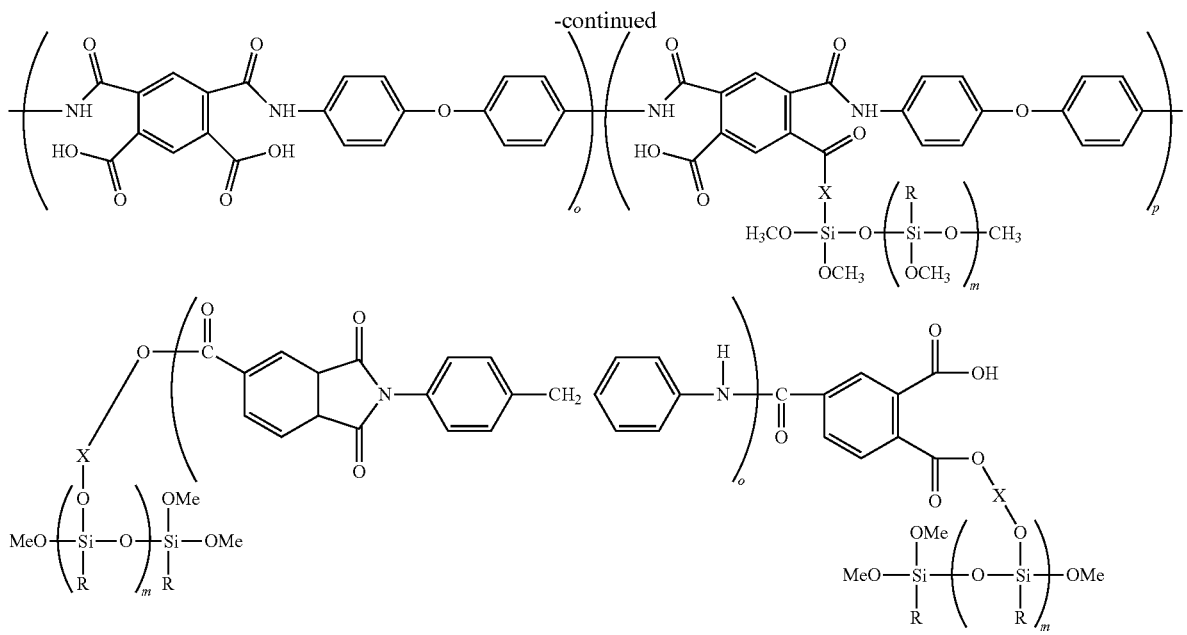

(In the above group, m, o and p are each independently an integer of 2 or greater, R is independently a methyl group or a methoxy group, $R^1$ is a hydrogen atom or a methyl group, and X is independently a linking group.)

As a specific example of the specific polymer, a polymer in which a group represented by the following formula (2) is bonded to a side chain of a vinyl polymer can be also mentioned.

[Chem. 3]

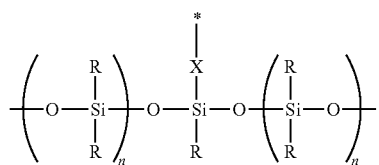

(2)

In the formula (2), R is independently a hydrocarbon group, an alkoxy group, an aryloxy group or an acyl group, preferably a hydrocarbon group, more preferably a methyl group.

n is independently an integer of 2 or greater.

X is a single bond or an alkylene group.

Examples of the vinyl polymers include polystyrene, styrene/acrylonitrile copolymer, acrylonitrile/ethylene/styrene copolymer, acrylonitrile/chlorinated polyethylene/styrene copolymer, acrylonitrile/styrene/acrylate copolymer, acrylonitrile/butadiene/styrene copolymer and styrene/(meth)acrylate copolymer.

As the specific polymer, a commercial product can be used. Examples of the commercial products include "COMPOCERAN E" (product name) that is an alkoxy group-containing silane-modified bisphenol A type epoxy resin or an alkoxy group-containing silane-modified novolak type epoxy resin, "COMPOCERAN AC" (product name) that is an alkoxy group-containing silane-modified acrylic resin, "COMPOCERAN P" (product name) that is an alkoxy group-containing silane-modified phenolic resin, "COMPOCERAN H800" (product name) that is alkoxy group-containing silane-modified polyamide acid, "COMPOCERAN H700" (product name) that is an alkoxy group-containing silane-modified soluble polyimide resin, "UREARNO U" (product name) that is an alkoxy group-containing silane-modified polyurethane resin, and "COMPOCERAN H900" (product name) that is an alkoxy group-containing silane-modified polyamideimide resin (all being manufactured by Arakawa Chemical Industries, Ltd.).

In the present invention, the present electrode material may be produced by heating only the specific polymer as a raw material, but the present electrode material may be produced by heating another raw material together with the specific polymer. Although another raw material is not specifically restricted, it is preferably a carbon material from the viewpoint that an electrode material capable of further enhancing cycle property of an electric storage device is obtained. The specific polymer may be heated together with a reducing agent such as Mg.

Examples of the carbon materials include soft carbons, such as petroleum coke, coal pitch coke and polyvinyl chloride carbon; hard carbons, such as carbon black, polyvinylidene chloride carbon, sugar carbon, cellulose carbon, phenolic resin carbon and charcoals; materials obtained by graphitizing the soft carbons or the hard carbons through further heat treatment of them; carbon fibers, such as polyacrylonitrile-based carbon fiber, pitch-based carbon fiber and vapor-grown carbon fiber; and graphite, such as natural graphite and artificial graphite.

As the carbon material, a carbon material, a (002) interplanar distance d002 of which, as measured by X-ray diffractometry, is in the range of 0.335 to 0.338 nm, is preferable, and graphite is particularly preferable. Further, the carbon material is preferably a particulate carbon material, and its 50% volume cumulative diameter (also referred to as "D50" hereinafter) is preferably 0.1 to 20 μm.

In the present invention, the carbon material used together with the specific polymer can be used singly or as a mixture of two or more kinds.

When the present electrode material is used for a lithium ion secondary battery, the specific polymer is used preferably in an amount of 20 to 1000 parts by mass, particularly preferably 50 to 500 parts by mass, based on 100 parts by mass of the carbon material in the present invention. On the other hand, when the present electrode material is used for a lithium ion capacitor, the specific polymer is used preferably in an amount of 10 to 500 parts by mass, particularly preferably 30 to 200 parts by mass, based on 100 parts by mass of the carbon material.

The production process of the present invention is characterized by comprising a step of heating such a specific polymer as above, and more specifically, the production process preferably comprises a step (also referred to as a "carbonization step" hereinafter) of heat-treating the specific polymer at 600 to 3000° C. in an atmosphere substantially containing no oxygen. Although the atmosphere substantially containing no oxygen is not specifically restricted, it is, for example, an atmosphere of an inert gas such as nitrogen gas, argon gas or helium gas. The heating temperature is more preferably 700 to 2000° C., particularly preferably 900 to 1200° C. Use of the present electrode material obtained by heating at a heating temperature in the above range is preferable because an electrode having large discharge capacity tends to be obtained. The heating time is preferably 0.1 to 100 hours, more preferably 0.5 to 20 hours. During the carbonization step, the specific polymer may be heat-treated together with a reducing agent such as Mg.

In the production process of the present invention, a step (also referred to as an "oxidation step" hereinafter) of heat-treating the specific polymer at 200 to 400° C. in an oxygen-containing gas may be included prior to the carbonization step. By carrying out this step, the yield of carbon remaining after the carbonization step can be sometimes raised. The oxygen-containing gas is not specifically restricted as long as it is a gas containing at least oxygen, and the oxygen-containing gas may be air. In the oxidation step, the heating temperature is preferably 250 to 350° C., more preferably 290 to 310° C. Use of the present electrode material obtained through the step of heating at a heating temperature in this range is preferable because an electrode having large discharge capacity tends to be obtained. In the oxidation step, the heating time is preferably 0.1 to 100 hours, more preferably 0.5 to 20 hours. After the oxidation step and before the carbonization step, the resulting component may be pulverized, when needed.

When the present electrode material is produced by heating the specific polymer and another material, particularly the specific polymer and the carbon material, in the present invention, it is preferable that the specific polymer and the carbon material are mixed and then the resulting composition is heated (the oxidation step is carried out when necessary, and then the carbonization step is carried out). Examples of means to mix the specific polymer and the carbon material include pulverization mixing, solution mixing and melt mixing. The temperature for mixing them is not specifically restricted, but in the case of melt mixing, the temperature is preferably 25 to 300° C., particularly preferably 100 to 250° C. The mixing time has only to be a time in which the components are homogeneously mixed in the above temperature range, and is not specifically restricted. In the case where the mixing is carried out in an oxygen-containing gas and at a mixing temperature similar to the temperature in the oxidation step, the oxidation step can be carried out simultaneously with the mixing. For mixing the specific polymer and the carbon material, an apparatus, such as a kneader or a twin-screw extruder, can be used.

In the present invention, the present electrode material may be produced by carrying out the carbonization step, then pulverizing the product obtained in the carbonization step and carrying out a step of heating the resulting silicon-containing particles together with a carbon precursor. More specifically, it is preferable to produce the present electrode material by pulverizing the product obtained in the carbonization step so that D50 might preferably become not more than 20 μm, mixing the resulting silicon-containing particles and a carbon precursor and then carrying out a step of heating the mixture to carbonize the carbon precursor. When the silicon-containing particles and the carbon precursor are mixed and heated, the same means and conditions as those in the case of mixing and heating the specific polymer and the carbon material can be adopted. The silicon-containing particles and the carbon precursor used can be individually used singly or as a mixture of two or more kinds.

Examples of the carbon precursors include pitch, such as petroleum-based pitches and coal-based pitch; extracts obtained by solvent extraction of coal; thermoplastic resins, such as polyvinyl chloride, polyvinylidene chloride, polyvinyl alcohol, polyethylene, polyethylene terephthalate, polyvinylpyrrolidone, polyacrylonitrile, styrene/acrylonitrile copolymer (AS resin), styrene/ethylene•butylene/styrene block copolymer, acrylonitrile/butadiene/styrene copolymer (ABS resin), acrylonitrile/ethylene/styrene copolymer (AES resin), acrylonitrile/chlorinated polyethylene/styrene copolymer (ACS resin), acrylonitrile/styrene/acrylate copolymer (ASA resin) and polyimide; thermosetting resins, such as phenolic resin, melamine resin and epoxy resin; and synthetic rubbers, such as acrylonitrile/butadiene rubber (NBR). When the silicon-containing particles and the carbon precursor are heated, they may be heated together with a reducing agent such as Mg.

In the present invention, D50 of the present electrode material is preferably 0.1 to 40 μm, more preferably 0.5 to 25 μm. Use of an electrode material having D50 in the above range is preferable from the viewpoint of enhancement in output and coulombic efficiency (discharge capacity/charge capacity) of an electric storage device. When the present electrode material is used particularly for a lithium ion secondary battery, it is possible to use a material having D50 in the above range, but from the viewpoint that side reaction rarely occurs during charge and discharge, it is preferable to use the present electrode material particularly having D50 of not less than 10 μm. On the other hand, when the present electrode material is used particularly for a lithium ion capacitor, a material having D50 of 0.5 to 10 μm is preferable, a material having D50 of 0.5 to 7 μm is more preferable, and a material having D50 of 1 to 5 μm is still more preferable. If D50 is less than the lower limit of the above range, there is a fear of difficulty in handling in the preparation of electrode. If D50 exceeds the upper limit of the above range, there is a fear of lowering of output property of the lithium ion capacitor. D50 is measured by a laser diffraction scattering method.

In the production process of the present invention, a step of pulverizing the finally obtained product is preferably included in order to adjust D50 of the present electrode material to the above range. The pulverization method is, for example, a method of using a ball mill, a cutter mill, a jet mill or the like.

Since the present electrode material obtained as above can occlude or discharge lithium ions, it is preferably used as a negative electrode material of an electric storage device and is particularly preferably used as a negative electrode material of a lithium ion secondary battery or a lithium ion capacitor.

Electrode

The electrode of the present invention comprises the present electrode material. In such an electrode, the present electrode material is thought to play a role of an active material. Specifically, an electrode having an active material layer containing the present electrode material on one surface of a collector is preferable. Such an electrode may have an active material layer directly on a collector, or may have an active material layer on a collector through a conductive layer or the like. Since the present electrode material can occlude or discharge lithium ions, the electrode is preferably a negative electrode and is particularly preferably a negative electrode of a lithium ion secondary battery or a lithium ion capacitor.

When the electrode of the present invention is used as a negative electrode, a positive electrode may comprise the present electrode material or may not comprise the present electrode material.

The active material layer is not specifically restricted as long as the present electrode material is contained therein. However, this layer usually comprises a binder, and if necessary, comprises other arbitrary components within limits not detrimental to the effect of the present invention.

Examples of production processes for such an electrode include a process comprising applying a slurry containing a binder, the present electrode material, a solvent and other arbitrary components to a collector or the like and drying the slurry, a process comprising providing a conductive layer or the like on a collector in advance, applying the slurry onto the conductive layer or the like and drying the slurry, and a process comprising forming an active material layer in the form of a sheet in advance and sticking it to a collector preferably using a conductive adhesive or the like.

The content of the present electrode material in the active material layer is preferably 10 to 100% by mass, more preferably 70 to 97% by mass. The present electrode materials may be used singly or may be used in combination of two or more kinds different in production process, etc.

Examples of the binders in the electrode of the present invention include rubber-based binders, such as styrene/butadiene rubber (SBR) and acrylonitrile/butadiene rubber (NBR); fluorine-based resins, such as polyethylene tetrafluoride and polyvinylidene fluoride; polypropylene; polyethylene; and such fluorine-modified (meth)acrylic-based binders as disclosed in JP-A-2009-246137. Although the amount of the binder used is not specifically restricted, it is preferably 1 to 20% by mass, particularly preferably 1.5 to 10% by mass, based on the present electrode material.

The binders can be used singly or as a mixture of two or more kinds.

The solvent is not specifically restricted, but for example, N-methyl-2-pyrrolidone, dimethylformamide, isopropanol or water can be mentioned. The solvent is desirably used in such an amount that the solids concentration of the slurry preferably becomes 35 to 70% by mass, more preferably 40 to 65% by mass.

In the active material layer to constitute the electrode of the present invention, conductive agents, such as carbon black, graphite and metal powder, or thickening agents, such as carboxymethyl cellulose, its Na salt or ammonium salt, methyl cellulose, hydroxymethyl cellulose, ethyl cellulose, hydroxypropyl cellulose, polyvinyl alcohol, oxidized starch, phosphorylated starch and casein, may be further contained.

When the electrode of the present invention is a positive electrode, the material of the collector in the electrode of the present invention is preferably aluminum, stainless steel or the like. On the other hand, when the electrode of the present invention is a negative electrode, the material of the collector is preferably copper, nickel, stainless steel or the like. In any of the positive electrode and the negative electrode, the thickness of the collector is usually 10 to 50 µm. When the electrode of the present invention is an electrode used for a lithium ion capacitor, the collectors of the positive and negative electrodes are each preferably provided with through holes passing between the front and back surfaces, and the aperture ratio is preferably 10 to 70%. Examples of the collectors having such through holes include an expanded metal, a perforated metal and a porous metal foil having through holes formed by etching.

Although the thickness of the active material layer containing the present electrode material is not specifically restricted, it is usually 5 to 500 µm, preferably 10 to 200 µm, particularly preferably 10 to 100 µm. When the electrode of the present invention is used for a lithium ion secondary battery, the density of the active material layer containing the present electrode material is preferably 1.50 to 2.00 g/cc, particularly preferably 1.60 to 1.90 g/cc. On the other hand, when the electrode of the present invention is used for a lithium ion capacitor, the density of the active material layer containing the present electrode material is preferably 0.50 to 1.50 g/cc, particularly preferably 0.70 to 1.20 g/cc. When the density of the active material layer is in this range, it becomes possible to provide an electric storage device of high capacity and low resistance because the balance between electrolytic solution retaining property and contact resistance of the present electrode material is good.

Electric Storage Device

The electric storage device of the present invention is equipped with the electrode of the present invention as a negative electrode. Examples of the electric storage devices include a nonaqueous electrolyte secondary battery, an electric double layer capacitor and a lithium ion capacitor. The electric storage device of the present invention is preferably a lithium ion secondary battery or a lithium ion capacitor, which is equipped with the electrode of the present invention as a negative electrode.

The electric storage device of the present invention is equipped with at least a positive electrode and an electrolyte, in addition to the electrode of the present invention used as a negative electrode. The constitution of the electrode of the present invention used as a negative electrode and the production process for the electrode are as described in the aforesaid "Electrode".

In the electric storage device of the present invention, the basic constitution of the positive electrode and the production process therefor are the same as the constitution and the production process described in the aforesaid "Electrode", except for using the following positive electrode active material instead of the present electrode material. When the electric storage device of the present invention is a lithium ion secondary battery, examples of the positive electrode active materials used therefor include lithium transition metal composite oxides, such as a lithium cobalt oxide, a lithium nickel oxide and a lithium manganese oxide, transition metal oxides, such as a manganese dioxide, and carbonaceous materials such as a fluorinated graphite. On the other hand, when the electric storage device of the present invention is a lithium ion capacitor, examples of the positive electrode active materials used therefor include activated carbon and polyacene-based substances. These positive electrode active materials can be used singly or as a mixture of two or more kinds.

In the electric storage device of the present invention, the electrolyte is usually used in the form of an electrolytic solution in which the electrolyte is dissolved in a solvent. In the present invention, the electrolyte is preferably an electrolyte capable of forming a lithium ion, and specific examples thereof include $LiClO_4$, $LiAsF_6$, $LiBF_4$, $LiPF_6$, $LiN(C_2F_5SO_2)_2$, $LiN(CF_3SO_2)_2$ and $LiN(FSO_2)_2$.

These electrolytes can be used singly or as a mixture of two or more kinds.

The solvent for dissolving the electrolyte is preferably an aprotic organic solvent, and specific examples thereof include ethylene carbonate, propylene carbonate, butylene carbonate, 1-fluoroethylene carbonate, 1-(trifluoromethyl) ethylene carbonate, dimethyl carbonate, diethyl carbonate, methylethyl carbonate, γ-butyrolactone, acetonitrile, dimethoxyethane, tetrahydrofuran, dioxolane, methylene chloride and sulfolane. These solvents can be used singly or as a mixture of two or more kinds.

In order to reduce the internal resistance due to the electrolytic solution, the concentration of the electrolyte in the electrolytic solution is preferably not less than 0.1 mol/L, more preferably in the range of 0.5 to 1.5 mol/L. In the electrolytic solution, additives, such as vinylene carbonate, vinylethylene carbonate, succinic anhydride, maleic anhydride, propane sultone and diethylsulfone, may be contained.

The electrolyte is usually used in the form of a liquid that is prepared as above, but in order to prevent liquid leakage, an electrolyte in the form of a gel or a solid may be used.

When the electrolyte is used in the form of an electrolytic solution, a separator is usually provided between the positive electrode and the negative electrode in order to prevent physical contact between the positive electrode and the negative electrode. Examples of the separators include nonwoven fabrics and porous films, which are obtained using cellulose rayon, polyethylene, polypropylene, polyamide, polyester, polyimide, etc. as raw materials.

The structure of the electric storage device is, for example, a lamination type cell wherein an electrode body having 3 or more plate-shaped positive electrodes and 3 or more plate-shaped negative electrodes, which are laminated alternately through separators, is enclosed by an outer film, or a winding type cell wherein an electrode body having a belt-shaped positive electrode and a belt-shaped negative electrode, which are wound around through a separator, is encased in a polygonal or cylindrical container.

EXAMPLES

The embodiments of the present invention are further described with reference to the following examples, but it should be construed that the present invention is in no way limited to those examples.

[Applications to Secondary Batteries]

Example 1

<Production of Electrode Material>

In a kneader, 100 parts by mass of commercially available artificial graphite (D50: 10 μm, interplanar distance d002 as measured by X-ray diffraction: 0.3356 nm) and 100 parts by mass of a polysiloxane unit-bonded bisphenol A type epoxy resin (manufactured by Arakawa Chemical Industries, Ltd., product name: COMPOCERAN E201, solvent-free, silicon content in cured residue: 26% by mass in terms of silica) were kneaded for 2 hours while heating them to 200° C.

The resulting kneadate was heated at 1000° C. for 2 hours in a nitrogen atmosphere. Thereafter, the kneadate was pulverized by a ball mill, and the pulverizate was sieved and classified. The resulting electrode material had D50 of 18 μm. D50 of the resulting electrode material and the artificial graphite used as a raw material was measured by the use of a laser diffraction scattering type particle size distribution measuring device LA-950V2 manufactured by Horiba, Ltd.).

<Production of Negative Electrode>

100 Parts by mass of the electrode material obtained by the above <Production of electrode material>, 5 parts by mass of polyvinylidene fluoride and 100 parts by mass of N-methyl-2-pyrrolidone were mixed to prepare a negative electrode slurry. The resulting negative electrode slurry was applied onto a copper foil having a thickness of 20 μm by the use of a die coater and dried, whereby a negative electrode (1) having a negative electrode active material layer formed on the copper foil was produced. The thickness of the negative electrode was 61 μm.

<Production of Negative Electrode Monopolar Cell>

A negative electrode monopolar cell was prepared by the use of a prefabricated bipolar cell (TYS-00DM01, manufactured by Toyo System Co., Ltd.) for battery evaluation.

The negative electrode (1) prepared by the above procedure was cut to give one negative electrode having a size of 12 mm in diameter, and as a counter electrode, a lithium electrode composed of metallic lithium and having the same size and a thickness of 150 μm was prepared. One negative electrode thus cut and one lithium electrode were laminated upon each other through cellulose/rayon mixed nonwoven fabric as a separator to obtain a laminate.

The resulting laminate was arranged in the bipolar cell. Thereafter, an electrolytic solution (solution obtained by dissolving $LiPF_6$ in a mixed solvent of ethylene carbonate, diethyl carbonate and dimethyl carbonate (mass ratio=1:1:1) so that the concentration might become 1.2 mol/L) was poured into the cell, and vacuum impregnation treatment was carried out to prepare a negative electrode monopolar cell.

<Property Evaluation of Negative Electrode Monopolar Cell>

Using the negative electrode monopolar cell obtained in the above <Production of negative electrode monopolar cell>, (1) charge up to 0 V was carried out at 60° C. and a constant current of 2 mA; (2) after 0V was reached, continuous charge was carried out at a constant voltage for 3 hours; and thereafter (3) discharge up to 3.0 V was carried out at a constant current of 1 mA (the above steps (1) to (3) were taken to be one cycle). This cycle was repeated 10 times. Discharge capacity at the first cycle and discharge capacity at the tenth cycle were measured. The results are set forth in Table 1.

Example 2

An electrode material was produced in the same manner as in Example 1, except that a polysiloxane unit-bonded novolak phenolic resin (manufactured by Arakawa Chemical Industries, Ltd., product name: COMPOCERAN P501, solvent-free, silicon content in cured residue: 44% by mass in terms of silica) was used instead of the polysiloxane unit-bonded bisphenol A type epoxy resin. The resulting electrode material had D50 of 22 μm.

Using the resulting electrode material, a negative electrode and a negative electrode monopolar cell were produced in the same manner as in Example 1. Then, discharge capacity at the first cycle and discharge capacity at the tenth cycle were measured. The results are set forth in Table 1.

Example 3

In Example 1, 300 parts by mass of a polysiloxane unit-bonded polyamide acid solution (manufactured by Arakawa Chemical Industries, Ltd., product name: COMPOCERAN H802, triglyme solution, cured residue: 60% by mass, silicon content in cured residue: 2% by mass in terms of silica) were used instead of 100 parts by mass of the polysiloxane unit-bonded bisphenol A type epoxy resin, and kneading temperature was changed to room temperature. After kneading, the solvent in the kneadate was removed under reduced pressure. The cured residue means a solid component obtained by curing a polymer and removing a volatile component. Using the resulting kneadate, an electrode material was produced in the same manner as in Example 1. The resulting electrode material had D50 of 17 μm.

Using the resulting electrode material, a negative electrode and a negative electrode monopolar cell were produced in the same manner as in Example 1. Then, discharge capacity at the first cycle and discharge capacity at the tenth cycle were measured. The results are set forth in Table 1.

Example 4

In Example 1, 500 parts by mass of a polysiloxane unit-bonded polyamideimide solution (manufactured by Arakawa Chemical Industries, Ltd., product name: COMPOCERAN H903, N-methyl-2-pyrrolidone solution, cured residue: 30% by mass, silicon content in cured residue: 2% by mass in terms of silica) were used instead of 100 parts by mass of the polysiloxane unit-bonded bisphenol A type epoxy resin, and kneading temperature was changed to room temperature. After kneading, the solvent in the kneadate was removed under reduced pressure. Using the resulting kneadate, an electrode material was produced in the same manner as in Example 1. The resulting electrode material had D50 of 16 μm.

Using the resulting electrode material, a negative electrode and a negative electrode monopolar cell were produced in the same manner as in Example 1. Then, discharge capacity at the first cycle and discharge capacity at the tenth cycle were measured. The results are set forth in Table 1.

Example 5

On the basis of the description of Example 4 of JP-A-2002-220431, polysiloxane unit-bonded polyurethane was produced. The silicon content in the solid component of the polyurethane was 8% by mass in terms of silica. Then, an electrode material was produced in the same manner as in Example 1, except that the resulting polyurethane was used instead of the polysiloxane unit-bonded bisphenol A type epoxy resin. The resulting electrode material had D50 of 20 μm.

Using the resulting electrode material, a negative electrode and a negative electrode monopolar cell were produced in the same manner as in Example 1. Then, discharge capacity at the first cycle and discharge capacity at the tenth cycle were measured. The results are set forth in Table 1.

Example 6

On the basis of the description of Example 7 of JP-A-1990-8209, a polysiloxane unit-bonded styrene/acrylonitrile copolymer powder was produced. The resulting polymer powder was heated at 300° C. for 3 hours in the atmosphere and then heated at 1100° C. for 1 hour in a nitrogen atmosphere. The resulting silicon-containing carbon was pulverized by an agate mortar and then placed on a 25 μm sieve with a pan. On the silicon-containing carbon powder placed on the sieve, methanol was sprinkled. Subsequently, zirconia beads having a diameter of 5 mm were placed thereon, and the sieve was rotated, whereby a silicon-containing carbon powder having passed through the sieve of 25 μm was recovered from the pan. The resulting silicon-containing carbon powder was dried by a hot air dryer at 70° C. for 3 hours to produce an electrode material. The resulting electrode material had D50 of 17 μm.

Using the resulting electrode material, a negative electrode and a negative electrode monopolar cell were produced in the same manner as in Example 1. Then, discharge capacity at the first cycle and discharge capacity at the tenth cycle were measured. The results are set forth in Table 1.

Example 7

An electrode material was produced in the same manner as in Example 1, except that the polysiloxane unit-bonded styrene/acrylonitrile copolymer powder obtained in Example 6 was used instead of the polysiloxane unit-bonded bisphenol A type epoxy resin. The resulting electrode material had D50 of 18 μm.

Using the resulting electrode material, a negative electrode and a negative electrode monopolar cell were produced in the same manner as in Example 1. Then, discharge capacity at the first cycle and discharge capacity at the tenth cycle were measured. The results are set forth in Table 1.

Example 8

On the basis of the description of Example 4 of JP-A-1990-8209, a polysiloxane unit-bonded styrene polymer powder was produced. Then, an electrode material was produced in the same manner as in Example 1, except that the resulting styrene polymer powder was used instead of the polysiloxane unit-bonded bisphenol A type epoxy resin. The resulting electrode material had D50 of 15 μm.

Using the resulting electrode material, a negative electrode and a negative electrode monopolar cell were produced in the same manner as in Example 1. Then, discharge capacity at the first cycle and discharge capacity at the tenth cycle were measured. The results are set forth in Table 1.

Example 9

On the basis of the description of Example 6 of JP-A-1990-8209, a polysiloxane unit-bonded styrene/methyl methacrylate copolymer powder was produced. Then, an electrode material was produced in the same manner as in Example 1, except that the resulting styrene/methyl methacrylate copolymer powder was used instead of the polysiloxane unit-bonded bisphenol A type epoxy resin. The resulting electrode material had D50 of 17 μm.

Using the resulting electrode material, a negative electrode and a negative electrode monopolar cell were produced in the same manner as in Example 1. Then, discharge capacity at the first cycle and discharge capacity at the tenth cycle were measured. The results are set forth in Table 1.

Comparative Example 1

By referring to the description of Example 1 of JP-A-1990-8209, 1.5 parts by mass of 2-(p-vinylphenyl)ethylmethyldimethoxysilane and 98.5 parts by mass of octamethylcyclotetrasiloxane were condensed to produce polyorganosiloxane. Then, an electrode material was produced in the same manner as in Example 6, except that the resulting polyorganosiloxane was used instead of the polysiloxane unit-bonded styrene/acrylonitrile copolymer powder. The resulting electrode material had D50 of 18 μm.

Using the resulting electrode material, a negative electrode and a negative electrode monopolar cell were produced in the same manner as in Example 1. Then, discharge capacity at the first cycle and discharge capacity at the tenth cycle were measured. The results are set forth in Table 1.

Comparative Example 2

By referring to the description of Example 1 of JP-A-1990-8209, 46.5 parts by mass of styrene and 18.5 parts by mass of acrylonitrile were polymerized to produce a styrene/acrylonitrile copolymer. Then, an electrode material was produced in the same manner as in Example 6, except that the resulting styrene/acrylonitrile copolymer was used instead of the polysiloxane unit-bonded styrene/acrylonitrile copolymer powder. The resulting electrode material had D50 of 19 μm.

Using the resulting electrode material, a negative electrode and a negative electrode monopolar cell were produced in the same manner as in Example 1. Then, discharge capacity at the first cycle and discharge capacity at the tenth cycle were measured. The results are set forth in Table 1.

Comparative Example 3

An electrode material was produced in the same manner as in Example 6, except that a mixture obtained by mixing 40 parts by mass of polyorganosiloxane obtained in Comparative Example 1 and 60 parts by mass of the styrene/acrylonitrile copolymer obtained in Comparative Example 2 was used instead of the polysiloxane unit-bonded styrene/acrylonitrile copolymer powder. The resulting electrode material had D50 of 17 μm.

Using the resulting electrode material, a negative electrode and a negative electrode monopolar cell were produced in the same manner as in Example 1. Then, discharge capacity at the first cycle and discharge capacity at the tenth cycle were measured. The results are set forth in Table 1.

Comparative Example 4

A negative electrode and a negative electrode monopolar cell were produced in the same manner as in Example 1, except that commercially available artificial graphite used in Example 1 was used instead of the electrode material obtained in Example 1. Then, discharge capacity at the first cycle and discharge capacity at the tenth cycle were measured. The results are set forth in Table 1.

Comparative Example 5

An electrode material was produced in the same manner as in Example 1, except that a mixture obtained by mixing 40 parts by mass of polyorganosiloxane obtained in Comparative Example 1 and 60 parts by mass of the styrene/acrylonitrile copolymer obtained in Comparative Example 2 was used instead of the polysiloxane unit-bonded bisphenol A type epoxy resin. The resulting electrode material had D50 of 18 μm.

Using the resulting electrode material, a negative electrode and a negative electrode monopolar cell were produced in the same manner as in Example 1. Then, discharge capacity at the first cycle and discharge capacity at the tenth cycle were measured. The results are set forth in Table 1.

TABLE 1

|  | Discharge capacity (mAh/g) | |
| --- | --- | --- |
|  | First cycle | Tenth cycle |
| Ex. 1 | 492 | 482 |
| Ex. 2 | 581 | 564 |
| Ex. 3 | 357 | 344 |
| Ex. 4 | 352 | 339 |
| Ex. 5 | 373 | 365 |
| Ex. 6 | 539 | 534 |
| Ex. 7 | 423 | 406 |
| Ex. 8 | 349 | 342 |
| Ex. 9 | 349 | 338 |
| Comp. Ex. 1 | 3 | 1 |
| Comp. Ex. 2 | 91 | 81 |
| Comp. Ex. 3 | 45 | 22 |
| Comp. Ex. 4 | 339 | 319 |
| Comp. Ex. 5 | 195 | 172 |

[Applications to Lithium Ion Capacitors]

Electrode materials were produced in the same manner as in Examples 1 to 5 and 7 to 9, except that graphite (D50: 3 μm, interplanar distance d002 as measured by X-ray diffraction: 0.3365 nm) obtained by atomizing commercially available artificial graphite was used instead of the commercially available artificial graphite and that the amount of the polysiloxane unit-bonded polymer used was reduced to ⅓ of each amount in Examples 1 to 5 and 7 to 9. The resulting electrode materials were pulverized so that D50 might become 4 μm, and classified.

It was confirmed that by the use of each of the resulting electrode materials as a negative electrode active material, a lithium ion capacitor which was free from generation of a gas during lithium ion predoping and had high energy density and high output density was obtained. In this case, as a positive electrode active material, activated carbon having a specific surface area of 2050 m$^2$/g was used, and as an electrolytic solution, a solution obtained by dissolving LiPF$_6$ in a mixed solvent of ethylene carbonate, diethyl carbonate and dimethyl carbonate (volume ratio=3:1:4) so that the concentration might become 1.2 mol/L was used.

On the other hand, when a negative electrode active material composed of only the atomized artificial graphite was used as a negative electrode active material, a gas was generated during lithium ion predoping.

What is claimed is:

1. A process for producing an electrode material, comprising:
    heating a polymer having a silicon-containing unit and a silicon-non-containing unit,
    wherein the electrode material comprises the heated polymer and has a 50% volume cumulative diameter of 0.1 to 40 μm.

2. The process of claim 1,
    wherein the silicon-containing unit is a unit having a repeating unit comprising a silicon atom, and the silicon-non-containing unit is a unit having a repeating unit comprising no silicon atom.

3. The process of claim 1, wherein the silicon-containing unit is a unit having at least one structure selected from the group consisting of a polysiloxane structure, a polysilane structure, a polysilazane structure and a polycarbosilane structure.

4. The process of claim 1, wherein the silicon-non-containing unit is a unit having at least one structure selected from the group consisting of an epoxy resin structure, a phenolic resin structure, a vinyl polymer structure, a polyamide acid structure, a polyimide structure, a polyamideimide structure and a polyurethane structure.

5. An electrode, comprising:
an electrode material obtained by the process of claim 1.

6. An electric storage device, comprising:
the electrode of claim 5 as a negative electrode.

7. The process of claim 1, wherein the electrode material is an active material.

8. The process of claim 1, further comprising:
pulverizing the heated polymer such that the electrode material has the 50% volume cumulative diameter of 0.1 to 40 μm.

9. The process of claim 8, further comprising:
preheating the polymer having a silicon-containing unit and a silicon-non-containing unit at a temperature of from 200 to 400 ° C. prior to the heating,
wherein, in the heating, the polymer having a silicon-containing unit and a silicon-non-containing unit is heated at a temperature of from 600 to 3,000 ° C.

10. An electrode, comprising:
an electrode material obtained by the process of claim 1; and
a binder.

11. A process for producing an electrode material, comprising:
heating a composition comprising a polymer having a silicon-containing unit and a silicon-non-containing unit and a carbon material,
wherein the electrode material comprises the heated polymer and has a 50% volume cumulative diameter of 0.1 to 40 μm.

12. The process of claim 11, wherein the silicon-containing unit is a unit having a repeating unit comprising a silicon atom, and
the silicon-non-containing unit is a unit having a repeating unit comprising no silicon atom.

13. The process of claim 11, wherein the silicon-containing unit is a unit having at least one structure selected from the group consisting of a polysiloxane structure, a polysilane structure, a polysilazane structure and a polycarbosilane structure.

14. The process of claim 11, wherein the silicon-non-containing unit is a unit having at least one structure selected from the group consisting of an epoxy resin structure, a phenolic resin structure, a vinyl polymer structure, a polyamide acid structure, a polyimide structure, a polyamideimide structure and a polyurethane structure.

15. The process of claim 11, wherein the carbon material is graphite.

16. An electrode, comprising:
an electrode material obtained by the process of claim 11.

17. An electric storage device, comprising:
the electrode of claim 16 as a negative electrode.

18. The process of claim 11, wherein the electrode material is an active material.

19. The process of claim 11, further comprising:
pulverizing the heated polymer such that the electrode material has the 50% volume cumulative diameter of 0.1 to 40 μm.

20. An electrode, comprising:
an electrode material obtained by the process of claim 11; and
a binder.

* * * * *